(12) United States Patent
Szadkowski et al.

(10) Patent No.: US 6,799,667 B2
(45) Date of Patent: Oct. 5, 2004

(54) CLUTCH LEVER TAKING ADVANTAGE OF CENTRIFUGAL FORCES

(75) Inventors: Andrzej Szadkowski, Southern Pines, NC (US); Ronald B. Morford, Southern Pines, NC (US); Muneer Abusamra, Southern Pines, NC (US)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 09/950,104

(22) Filed: Sep. 10, 2001

(65) Prior Publication Data

US 2003/0047406 A1 Mar. 13, 2003

(51) Int. Cl.⁷ .............................................. F16D 13/56
(52) U.S. Cl. ................. 192/70.25; 192/70.3; 192/99 A
(58) Field of Search ............................. 192/70.25, 70.27, 192/70.29, 70.3, 89.24, 99 A, 111 A

(56) References Cited

U.S. PATENT DOCUMENTS

| | | | | |
|---|---|---|---|---|
| 1,657,731 A | * | 1/1928 | Wemp ....................... | 192/70.3 |
| 3,337,016 A | * | 8/1967 | Maucher .................... | 192/70.3 |
| 3,732,958 A | * | 5/1973 | Kraus et al. ............... | 192/70.3 |
| 4,848,550 A | * | 7/1989 | Kitano et al. .............. | 192/99 A |
| 5,078,247 A | * | 1/1992 | Meyer ....................... | 192/70.27 |
| 5,667,049 A | * | 9/1997 | Weidinger et al. ........ | 192/70.25 |

* cited by examiner

Primary Examiner—Richard M. Lorence
(74) Attorney, Agent, or Firm—Cohen, Pontani, Lieberman & Pavane

(57) ABSTRACT

A plurality of specially shaped clutch levers transmit rotation between an engine and a transmission in a clutch. The clutch levers are shaped such that the center of mass is on opposing sides of an axis of the clutch levers when the clutch levers are in the engaged and disengaged positions. The axis is the radial line passing through the pivot point of the clutch lever and is substantially perpendicular to the rotation of the clutch. In the engaged position, the center of mass is positioned on the pressure plate side of the axis, the moment rotating the clutch levers against the pressure plate to increase the clamp load. In the disengaged position, the center of mass is positioned on the transmission side of the axis, the moment rotating the clutch levers against the retainer to increase clutch lift. These conditions are satisfied during the entire life of the clutch.

18 Claims, 3 Drawing Sheets

CLUTCH LEVER TAKING ADVANTAGE OF CENTRIFUGAL FORCES

BACKGROUND OF THE INVENTION

The present invention relates generally to a clutch lever which takes advantage of centrifugal forces present during operation of the clutch to optimize both clamp load and clutch lift.

A clutch is utilized to selectively transmit rotation between a drive engine and a transmission. When the clutch is engaged, the clutch lever presses a pressure plate to engage adjacent clutch discs, transmitting rotation between the engine and the transmission. When the clutch is disengaged, the clutch lever is lifted from the pressure plate, releasing the pressure plate from the clutch discs and allowing the clutch discs to rotate relative to the engine flywheel and the clutch cover, disengaging the engine from the transmission.

When the engine is running, the clutch levers are under the influence of angular velocity which creates an acceleration that results in centrifugal forces acting on the clutch levers. The centrifugal force can influence not only clamp load when the clutch is engaged, but also strap deflection when the clutch is disengaged, which affects pressure plate position and lift, and release load.

In prior clutches, the influence of centrifugal forces on the clutch levers is usually neglected, especially in the disengaged position. Because the influence of centrifugal forces is usually ignored, clutch characteristics such as clamp load and clutch lift are not optimized of when the clutch is running, especially in medium and high RPM ranges.

Hence, there is a need in the art for a clutch lever which takes advantage of centrifugal forces present during operation of the clutch.

SUMMARY OF THE INVENTION

The present invention relates to a clutch lever which takes advantage of centrifugal forces present during operation of the clutch.

A plurality of clutch levers transmit rotation between an engine and a transmission. The clutch levers of the present invention are shaped so that the center of mass which is located on opposing sides of an axis of the clutch levers when the clutch levers are in the engaged and disengaged positions. The axis of the clutch levers is the radial line passing through the pivot point of the clutch levers and is substantially perpendicular to the rotation axis of the clutch. When the engine is running, the rotating clutch levers are under the influence of angular acceleration, resulting in centrifugal forces that act on the center of mass of the clutch lever.

When the clutch levers are in the disengaged position, the clutch levers are in a relaxed state and the center of mass is positioned on the transmission side of the axis. The resulting moment rotates the clutch lever against the retainer, adding to and increasing the clutch lift. When the clutch levers move to the engaged position, the clutch levers slightly deflect from the relaxed state, and the center of mass moves to the pressure plate side of the axis. The resulting moment rotates the clutch lever against the pressure plate, adding to and increasing the clamp load. These conditions are satisfied during the entire life of the clutch.

Accordingly, the present invention provides a clutch lever which takes advantage of centrifugal forces during present operation of the clutch.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
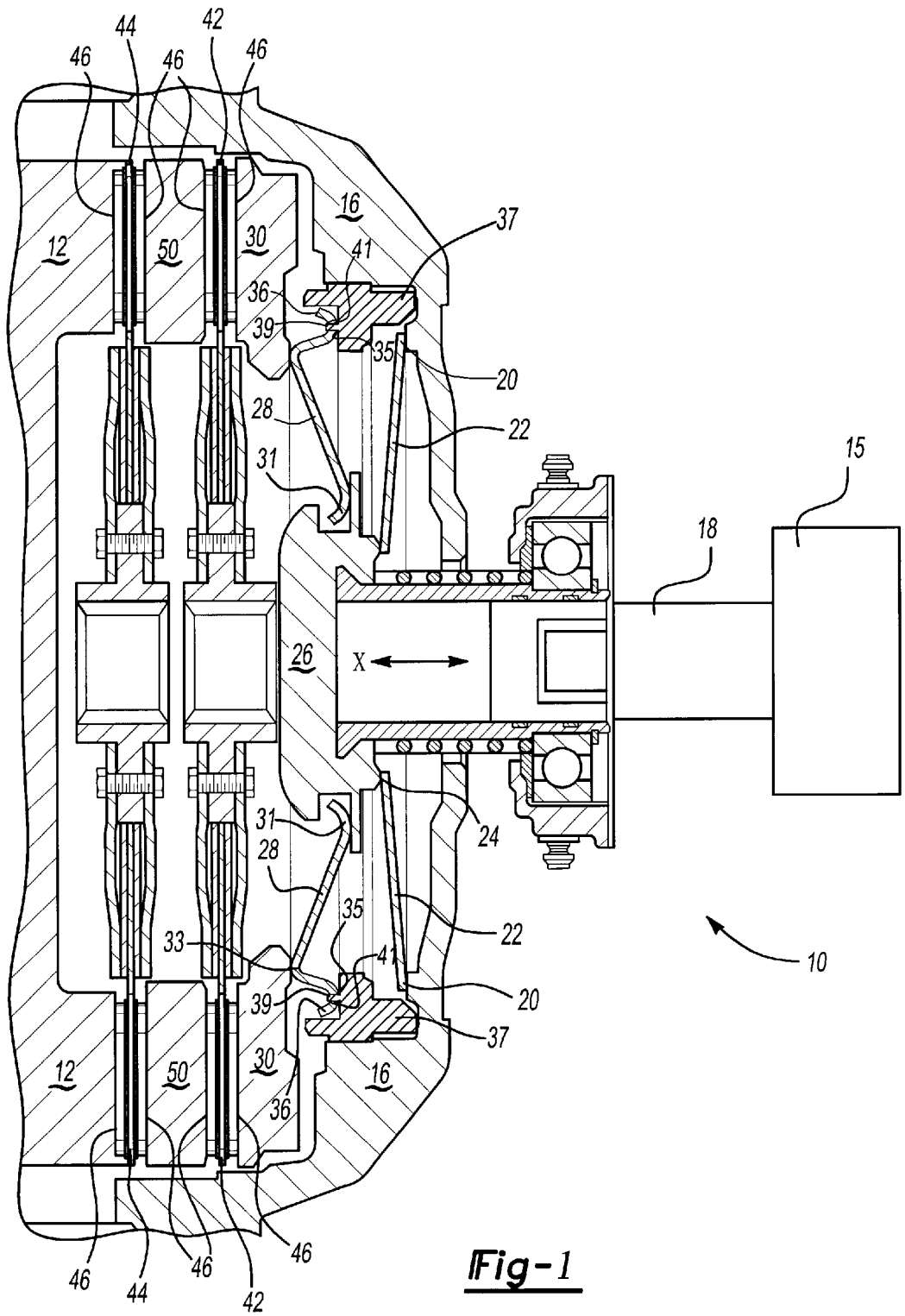
FIG. 1 illustrates the clutch in the engaged position.

The clutch 10 of the present invention is illustrated in FIG. 1 in an engaged position. The clutch 10 having rotation axis X selectively transmits rotation between a flywheel 12 of a drive engine and a transmission 15.

A clutch cover 16 encloses the clutch 10. An outer end 20 of a diaphragm spring 22 bears upon clutch cover 16, and an inner portion 24 of the diaphragm spring 22 is located in a retainer 26. A plurality of clutch levers 28 multiply the force of the diaphragm spring 22 on the retainer 26 and transmit the force to the pressure plate 30 having pressure plate surface 56a. Although only two clutch levers 28 are illustrated, there are preferably three to six clutch levers 28 positioned around a rotatable input shaft 18 of the transmission 15.

The clutch levers 28 are positioned in the clutch 10 such that an inner portion 31 is received in retainer 26 and an intermediate portion 33 is pressed against the pressure plate 30. An outer portion 36 of the clutch lever 28 includes a slot 41 which is pivotally received on a perch 39 on an adjusting ring 37. The clutch lever 28 pivots on the perch 39 about a pivot point 35.

The clutch 10 further includes first 44 and second clutch discs 42 which rotate with the input shaft 18. Second clutch disc 42 is positioned proximate to the pressure plate 30 and first clutch disc 44 is positioned proximate to the flywheel 12. An intermediate plate 50 secured to the clutch cover 16 is positioned between the clutch discs 42 and 44. Friction surfaces 46 are positioned between pressure plate 30, second clutch disc 42, intermediate plate 50, first clutch disc 44 and the flywheel 12.

Over time as the clutch 10 engages and disengages, the friction surfaces 46 wear, moving the pressure plate 30 farther from the intermediate portion 33 of the clutch lever 28. When wear is detected, an adjuster ring 37 attached to the clutch cover 16 axially moves in the x direction towards the pressure plate 30, moving the pivot point 35 and the intermediate portion 33 of the clutch lever 28 towards the pressure plate 30 and maintaining the position of the clutch lever 28.

When the engine and the transmission 15 are engaged, the flywheel 12 rotates with the input shaft 18 of the transmission 15. When the clutch 10 is engaged, the clutch levers 28 press on the pressure plate 30 so that the friction surfaces 46 engage adjacent friction surfaces 46. In the engaged state, the flywheel 12 rotates with the rotatable clutch discs 42 and 44.

Figure 2:
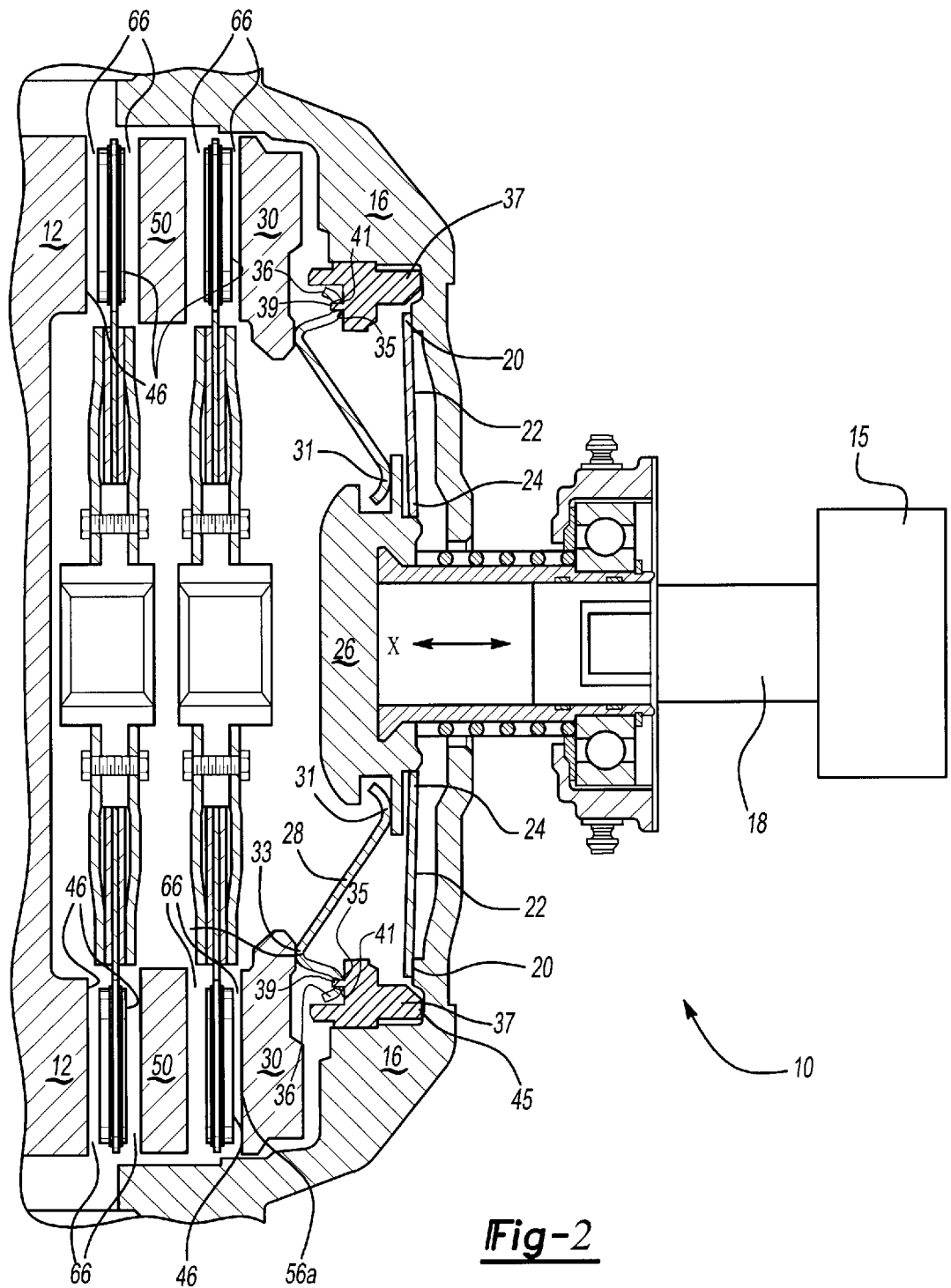
FIG. 2 illustrates the clutch in the disengaged position.

When a clutch pedal in the vehicle is pressed by the vehicle operator, the clutch 10 moves to the disengaged state as illustrated in FIG. 2. The retainer 26 moves towards the transmission 15, the diaphragm spring 22 providing resistance to this movement. As the retainer 26 moves towards the transmission 15, the clutch levers 28 pivot about the outer point 36, releasing pressure on the pressure plate 30. The pressure plate 30 is lifted by straps from the second clutch disc 44, creating gaps 66 between all friction surfaces 46. Because of the gaps 66, the clutch discs 42 and 44 do not rotate with the flywheel 12 and torque is not transmitted from the engine to the transmission 15.

Figure 3:
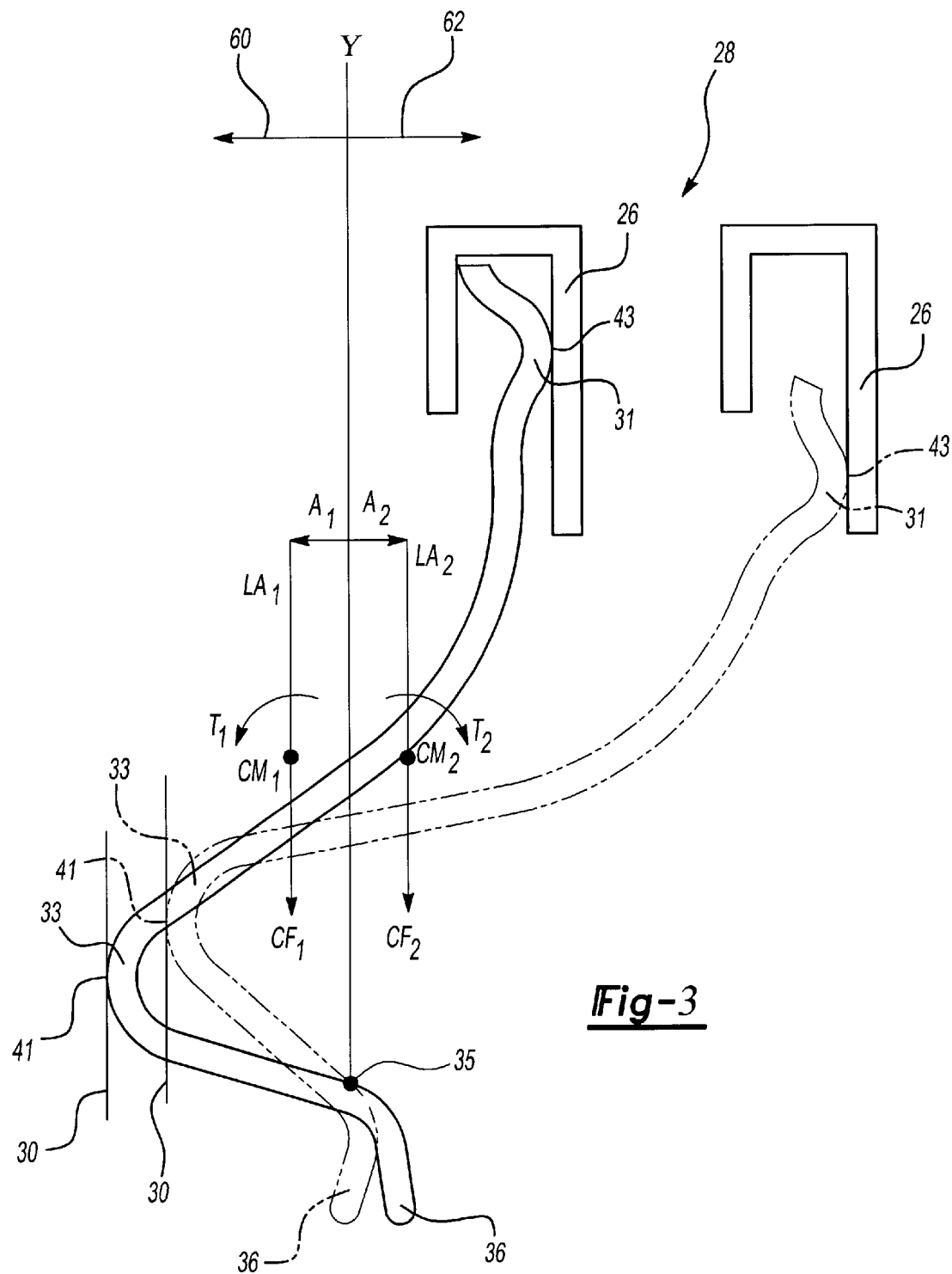
FIG. 3 illustrates the clutch lever of the present invention in the engaged and the disengaged positions.

The clutch lever 28 of the present invention is illustrated in FIG. 3 in both the engaged and disengaged positions. The engaged clutch lever 28 is shown in solid lines, and the disengaged clutch lever 28 is shown in dashed lines. When disengaged, the clutch lever 28 is in a relaxed state, and when engaged, the clutch lever 28 slightly deflects from the relaxed state.

The center of mass CM is the point in the clutch lever 28 which moves as if all the mass in the clutch lever 28 is concentrated at this point. Centrifugal forces that act on the clutch lever 28 can be shown as a concentrate resulting centrifugal force CF which acts on the center of mass CM. In the present invention, the clutch lever 28 is shaped such that the center of mass CM is located on opposing sides of axis Y when the clutch levers 28 are in the engaged and the disengaged position. The axis Y of the clutch lever 28 is the radial line passing through the pivot point 35 of the clutch lever 28 and is substantially perpendicular to a rotation axis X of the clutch 10.

When the engine is running and the input shaft 18 rotates, the clutch lever 28 rotates and is under the influence of angular acceleration. The angular velocity creates an angular acceleration which results in centrifugal forces CF acting on the clutch levers 28. The resultant centrifugal force CF acts on the center of mass CM of the clutch levers 28 along the line of action LA. The perpendicular distance of the line of action LA of the centrifugal force CF and the axis Y is the arm A of the centrifugal force CF. The product of the centrifugal force CF and the arm A is moment T of the centrifugal force CF.

When the clutch lever 28 is in the disengaged position shown in dashed lines in FIG. 3, the clutch lever 28 is in a relaxed state, and the center of mass $CM_2$ is positioned on the transmission side 62 of the axis Y by the arm $A_2$. Centrifugal force $CF_2$ acts along line of action $LA_2$. The resulting moment $T_2$ rotates the clutch lever 28 against the retainer 26, adding to and increasing the clutch lift.

When the clutch lever 28 moves to the engaged position shown as solid lines in FIG. 3, the clutch lever 28 slightly deflects from the relaxed state, and the center of mass $CM_1$ moves to the pressure plate side 60 of axis Y by the arm $A_1$. A centrifugal force $CF_1$ acts along line of action $LA_1$. The resulting moment $T_1$ rotates the clutch lever 28 against the pressure plate 30, adding to and increasing the clamp load.

The clutch lever 28 is shaped so that the center of mass CM is positioned on opposing sides of the axis Y when the clutch lever 28 is in the engaged and disengaged positions. However, it is preferable that the clutch lever 28 be shaped such that the center of mass $CM_2$ is positioned on the transmission side 62 proximate to the axis Y when the clutch lever 28 is relaxed and in the disengaged position. Therefore, when the clutch lever 28 moves to the engaged position, the clutch lever 28 rotation moves the center of mass $CM_1$ to the pressure plate side 60 of the axis Y.

There are several advantages to using the clutch lever 28 of the present invention. By designing and shaping the clutch lever 28, the center of mass CM can be positioned at a desired location to take advantage of the centrifugal force CF acting on the clutch levers 28, maximizing both the clamp load and the clutch lift of the clutch 10. Additionally, the center of mass CM is positioned on opposing sides of the axis Y during the entire life of the clutch 10 as the adjuster ring 37 moves to compensate for the wearing of the friction surfaces 46.

Accordingly, the present invention provides a clutch lever which takes advantage of centrifugal forces present during operation of the clutch.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A clutch assembly comprising:
   at least one clutch disc to be selectively brought into and out of engagement;
   a moveable pressure plate to selectively urge said at least one clutch disc into and out of engagement; and
   a plurality of clutch levers pivotable about a clutch lever axis substantially perpendicular to an axis of rotation of said at least one clutch disc between an engaged position and a disengaged position to selectively cause said pressure plate to move, a centrifugal force acting on a center of mass of said clutch levers to further urge said at least one clutch disc into and out of engagement, said center of mass of said clutch levers being on one side of said clutch lever axis when said clutch levers are in said engaged positions and being on an opposing side of said clutch lever axis when said clutch levers are in said disengaged position.

2. The clutch assembly as recited in claim 1, wherein said centrifugal force acts to pivot said clutch levers against said pressure plate when said clutch levers are in said engaged position to further urge said at least one clutch disc into engagement.

3. The clutch assembly as recited in claim 2, wherein said center of mass is located on a pressure plate side of said clutch lever axis to pivot said clutch levers against said pressure plate.

4. The clutch assembly as recited in claim 1, wherein said centrifugal force acts to pivot said clutch levers against a retainer when said clutch levers are in said disengaged position to further urge said at least one clutch disc out of engagement.

5. The clutch assembly as recited in claim 4, wherein said center of mass is located on a transmission side of said clutch lever axis to pivot said clutch levers against said retainer.

6. The clutch assembly as recited in claim 1, wherein an outer portion of each of said clutch levers is pivotally received in an adjuster ring, an intermediate portion of each of said clutch levers contacts said pressure plate to selectively cause said pressure plate to move, and an inner portion of said clutch levers is received in a retainer, axial movement of said retainer pivoting said clutch levers about said outer portion.

7. The clutch assembly as recited in claim 6, wherein said adjuster ring moves towards said pressure plate as said pressure plate and said at least one clutch disc wears, said adjuster ring moving said outer portion of each of said clutch levers towards said pressure plate.

8. The clutch as recited in claim 7, wherein said intermediate portion of each of said clutch levers press said pressure plate into engagement with said at least one clutch discs when said clutch levers are in an engaged position, and said intermediate portion of each of said clutch levers release said pressure plate from engagement with said at least one clutch disc, when said clutch levers are in a disengaged position.

9. The clutch assembly as recited in claim 1, wherein said center of mass is proximate to said clutch lever axis when said plurality of clutch levers are in said disengaged position.

10. A clutch assembly comprising:
a clutch cover;
a rotatable input shaft;
an axially moveable retainer connected to said input shaft;
at least one clutch disc to be selectively brought into and out of engagement;
a moveable pressure plate to selectively urge said at least one clutch disc into and out of engagement; and
a plurality of clutch levers pivotable about a clutch lever axis substantially perpendicular to an axis of rotation of said at least one clutch disc and positioned between said retainer and said pressure plate to selectively cause said pressure plate to move, axial movement of said retainer pivoting each of said clutch levers between an engaged position in which said clutch levers press said pressure plate into engagement with said at least one clutch disc to transmit rotation between a transmission and engine, and a disengaged position in which said clutch levers release said pressure plate from engagement with said at least one clutch disc to disengage rotation between said transmission and said engine, a centrifugal force acting on a center of mass of said clutch levers to further urge said at least one clutch disc into and out of engagement, said clutch levers bent such that said center of mass of said clutch levers is on one side of said clutch lever axis when said clutch levers are in said disengaged position and on another side when said clutch levers are engaged.

11. The clutch assembly as recited in claim 10, wherein said centrifugal force acts to pivot said clutch levers against said pressure plate, when said clutch levers are in said engaged position to further urge said at least one clutch disc into engagement.

12. The clutch assembly as recited in claim 10, wherein said center of mass is located on a pressure plate side of said clutch lever axis to pivot said clutch levers against said pressure plate.

13. The clutch assembly as recited in claim 10, wherein said centrifugal force acts to pivot said clutch levers against said retainer when said clutch levers are in said disengaged position to further urge said at least one clutch disc out of engagement.

14. The clutch assembly as recited in claim 13, wherein said center of mass is located on a transmission side of said clutch lever axis to pivot said clutch levers against said retainer.

15. The clutch assembly as recited in claim 10, wherein an outer portion of each of said clutch levers is pivotally received in an adjuster ring, an intermediate portion of each of said clutch levers contacts said pressure plate to selectively cause said pressure plate to move, and an inner portion of said clutch levers is received in a retainer, axial movement of said retainer pivoting said clutch levers about said outer portion.

16. The clutch assembly as recited in claim 15, wherein said adjuster ring moves towards said pressure plate as said pressure plate and said at least one clutch disc wears, said adjuster ring moving said outer portion of each of said clutch levers towards said pressure plate.

17. The clutch assembly as recited in claim 16, wherein said intermediate portion of each of said clutch levers press said pressure plate into engagement with said at least one clutch discs when said clutch levers are in an engaged position, and said intermediate portion of each of said clutch levers release said pressure plate from engagement with said at least one clutch disc, when said clutch levers are in a disengaged position.

18. The clutch assembly as recited in claim 10, wherein said center of mass is proximate to said clutch lever axis, when said plurality of clutch levers are in said disengaged position.

* * * * *